United States Patent [19]

Asami et al.

[11] 4,393,924
[45] Jul. 19, 1983

[54] HEAT EXCHANGE APPARATUS WITH USE OF HYDROGEN STORING MATERIAL

[75] Inventors: Takayoshi Asami, Ohtsu; Hidekazu Sonoi, Kobe, both of Japan

[73] Assignee: Kabushiki Kaisha Kobe Seiko Sho, Kobe, Japan

[21] Appl. No.: 274,194

[22] Filed: Jun. 16, 1981

[30] Foreign Application Priority Data

Jun. 23, 1980 [JP] Japan .............................. 55-85700

[51] Int. Cl.³ ............................................. F28D 21/00
[52] U.S. Cl. ................................... 165/104.12; 62/48
[58] Field of Search ................... 122/1 A, DIG. 12; 62/48; 126/263, 433; 165/48 R, 152, 104.12

[56] References Cited

U.S. PATENT DOCUMENTS

| | | | |
|---|---|---|---|
| 3,799,144 | 3/1974 | Ramsey et al. | 126/433 |
| 3,973,552 | 8/1976 | Ervin, Jr. | 165/104.12 X |
| 4,039,023 | 8/1977 | McClaine | 165/104.12 X |
| 4,040,410 | 8/1977 | Libowitz | 126/435 |
| 4,044,819 | 8/1977 | Cottingham | 165/104.12 X |
| 4,044,821 | 8/1977 | Fletcher et al. | 165/104.12 X |
| 4,051,888 | 10/1977 | Yamada et al. | 165/104.12 X |
| 4,071,935 | 2/1978 | Molitor | 165/152 |
| 4,161,210 | 7/1979 | Reid et al. | 165/104.12 X |
| 4,161,211 | 7/1979 | Duffy et al. | 62/48 X |
| 4,165,569 | 8/1979 | Mackay | 62/48 |
| 4,178,987 | 12/1979 | Bowman et al. | 62/48 X |
| 4,200,144 | 4/1980 | Sirovich | 165/104.12 X |

*Primary Examiner*—Leland A. Sebastian
*Attorney, Agent, or Firm*—Oblon, Fisher, Spivak, McClelland & Maier

[57] ABSTRACT

A regenerative heat exchange apparatus for use with a hydrogen storing material is presented. The apparatus includes a regenerator chamber packed with a heat storing material, and the regenerator chamber is disposed in between a high temperature fluid pathway and a low temperature fluid pathway of a heat exchanger. The high temperature fluid pathway is connected to a heat source and the low temperature fluid pathway is connected to a heat utilizing system. The regenerator chamber is connected via a pressure controlling mechanism to a hydrogen reservoir.

Excess heat of the high temperature fluid can be stored by a decomposition reaction (endothermic reaction) of the hydrogen storing material to discharge hydrogen, and a deficiency in the quantity of heat required for the low temperature fluid can be supplemented by a hydrogenation reaction (exothermic reaction) of the hydrogen storing material to absorb the discharged hydrogen.

7 Claims, 4 Drawing Figures

HEAT EXCHANGE APPARATUS WITH USE OF HYDROGEN STORING MATERIAL

BACKGROUND OF THE INVENTION

Field of the Invention

The present invention relates to a heat exchange apparatus for use with hydrogen storing material.

Description of the Prior Art

Recently, there have been sought various applications with respect to the energy transformation function of the decomposition reaction of metal hydrides. As one of the approaches for the applications, a study has been directed to development of a regenerative heat exchanger with use of the endothermic decomposition reaction and the exothermic hydrogenation reaction of metal hydrides.

This regenerative heat exchanger is a type of a heat exchanger wherein an excess heat temporarily created during steady heat transfer under an equilibrium condition due to fluctuations with time, is stored by an endothermic reaction conducted by decomposing the metal hydride and discharging a hydrogen gas, and a deficiency in the quantity of heat required for the heat utilizing system is supplemented by an exothermic hydrogenation reaction conducted by returning the discharged hydrogen gas to the initial state, whereby the differentials of the patterns of the input and output sides are leveled off. Thus, this regenerative heat exchanger is expected to be quite useful for effective utilization of the solar heat or heat of the exhaust gases from plants, which is quite variable with time.

There has been proposed a heat exchanger of this type which has a construction wherein a hydrogen storing tank is connected via a hydrogen flow control valve to a regenerator tank packed with a metal hydride power, a heat transfer pipe from a heat source and a heat transfer pipe for the heat utilizing system are disposed to cross at a right angle to each other in the regenerator tank, and heat transfer pipes connected to a cool water system and a hot water system are accomodated in the hydrogen storing tank. In a heat exchanger of such a construction, a heat transfer pipe from the heat source and a heat transfer pipe for the heat utilizing system are accomodated in the regenerator tank, and accordingly the manufacture of such an apparatus is complicated as an industrial installation, although it may be easy for a small scale installation. Further, it is necessary to provide a pressure control system by connecting the cool water system and the hot water system to the hydrogen storing tank, and such inevitably requires large installation and leads to a high cost for such an installation.

Further, such a heat exchanger for use with hydrogen storing material has not yet reached an industrially applicable level, and various studies are presently being made taking also the fields of application into account. There have been some developments in theory, but there have not yet been satisfactory results obtained on a practical level.

SUMMARY OF THE INVENTION

Under these circumstances, the present inventors have conducted various studies on methods for storing heat by transforming it into a chemical energy with use of reversible endothermic reactions, and as a result, it has been found that desired effectiveness is obtainable with simple construction by providing a so-called sandwich structure wherein a regenerator chamber packed with a hydrogen storing material is disposed in between a high temperature fluid pathway and a low temperature fluid pathway.

Accordingly, it is an object of the present invention to provide a regenerative heat exchanger for use with hydrogen storing material, which is simple in construction and which is suitable for a practical application.

Thus, the present invention provides a heat exchange apparatus for use with hydrogen storing material, which is characterized in that a regenerator chamber packed with a heat storing material is disposed in between a high temperature fluid pathway and a low temperature pathway of heat exchanger. The high temperature fluid pathway is connected to a heat source and the low temperature fluid pathway is connected to a heat utilizing system. The regenerator chamber is connected via a pressure controlling mechanism to a hydrogen holder.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

DETAILED DESCRIPTION OF THE PREFERRED EMBODIMENTS

Figure 1:
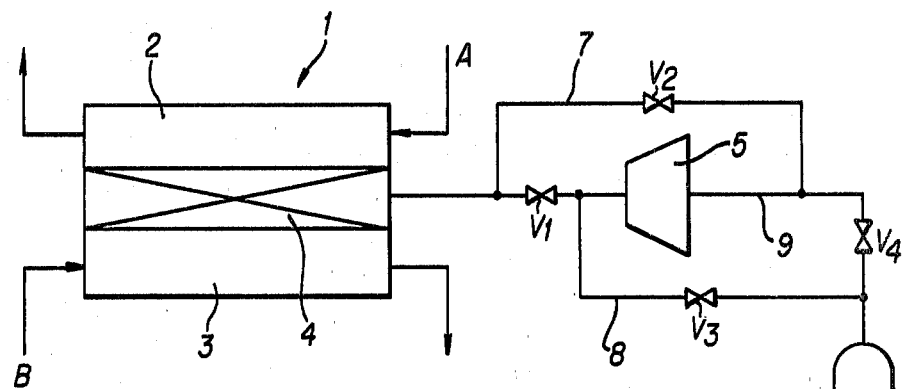
FIG. 1 is a schematic view illustrating an embodiment of the apparatus of the present invention.

The invention will now be described in detail with reference to the embodiments shown in the drawings.

Referring to FIG. 1, reference numeral 1 designates a heat exchanger which includes a high temperature fluid pathway 2, a low temperature fluid pathway 3, and a regenerator chamber 4 disposed between them and packed with a hydrogen storing material. Regenerator chamber 4 is connected via a pressure controlling mechanism to a hydrogen reservoir 6. As shown in FIG. 1, the pressure controlling mechanism includes a hydrogen supply line 9 which is provided with a compressor 5 and which extends from hydrogen reservoir 6 via a valve $V_4$, the compressor 5, and valve $V_1$ to regenerator chamber 4; a hydrogen withdrawal line 7 as a by-pass branching off from the regenerator chamber side of valve 1 and extending via a valve 2 to a point of line 9 between compressor 5 and valve $V_4$; and a high pressure line 8 as a by-pass branching off from a point of line 9 between valve $V_1$ and compressor 5 and extending via a valve 3 to a point between valve $V_4$ and hydrogen holder 6. The pressure controlling mechanism having the above construction performs a pressure controlling function to thereby control the level of the reaction. In FIG. 1 heat exchanger 1 is shown to have a three-layer construction. This is intended merely to show the fundamental mode of the heat exchanger, and various types of heat exchangers may be used without being restricted to the illustrated specific construction, so long as they follow the fundamental mode. For instance, a plate fin heat exchanger, or a triple pipe or double pipe type heat exchanger may be used, and as a double pipe type heat exchanger, there may be utilized a shell tube type heat exchanger wherein the space between the outer pipe and the inner pipe is adapted to form a regenerator chamber.

Especially in cases where the fluid pathways are divided into a multiple layers as in the case of the plate fin heat exchanger, it is possible to provide a regeneration chamber every second layer so that a plurality of the above mentioned three-layer constructions are formed. A multiple stage construction of this type is, of course, useful for the present invention.

Figure 2A:
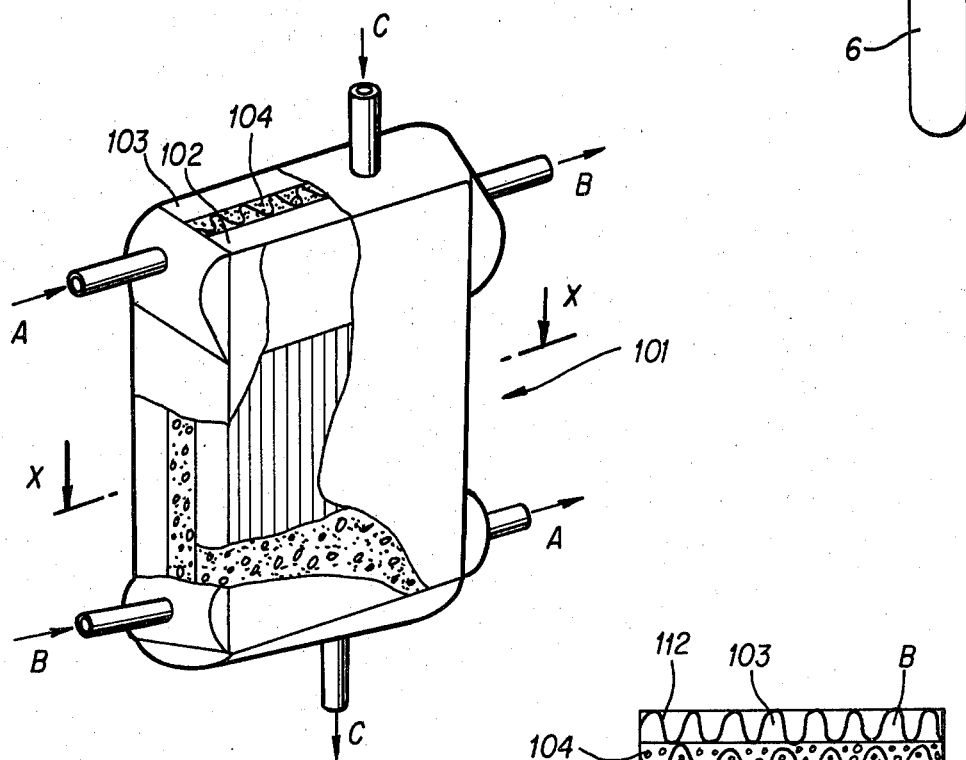
FIG. 2(a) illustrates a heat exchanger used for the apparatus of the present invention.
Figure 2B:
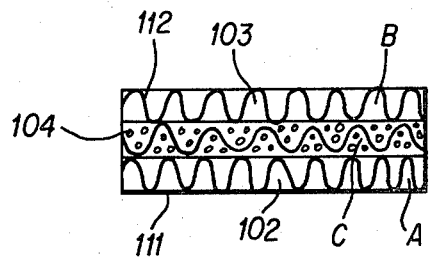
FIG. 2(b) is a cross sectional view of the heat exchanger taken along line X—X of FIG. 2(a).
Figure 3:
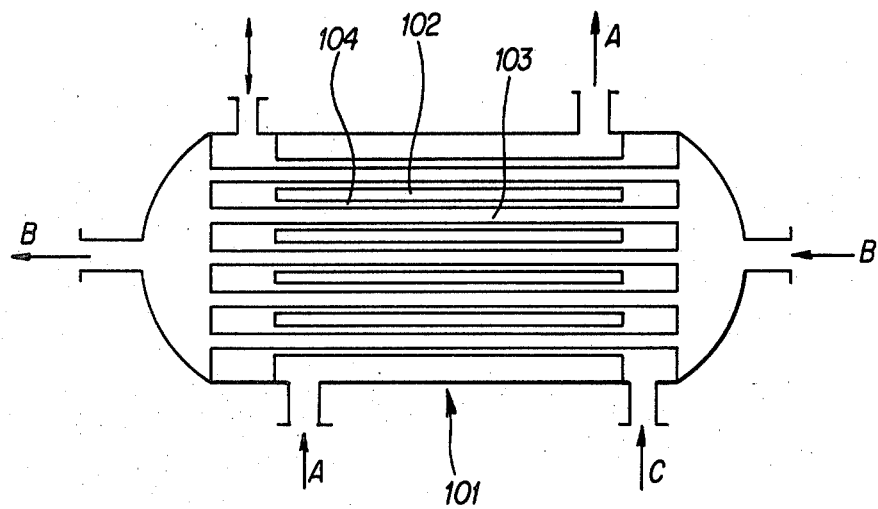
FIG. 3 illustrates a second embodiment of a heat exchanger used for the apparatus of the present invention.
Figure 4:
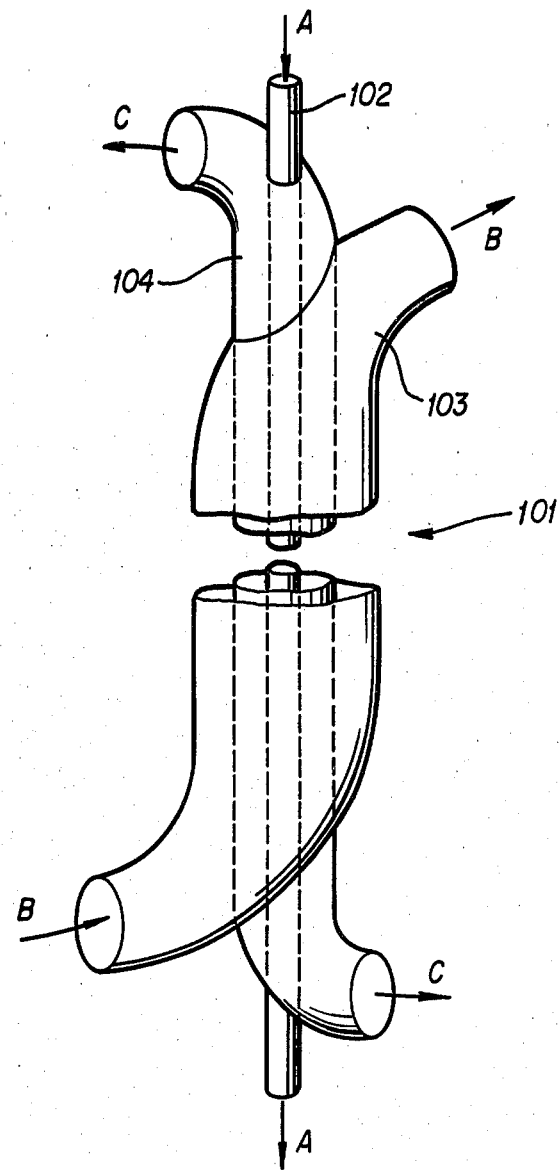
FIG. 4 illustrates a third embodiment of a heat exchanger useful for the apparatus of the invention.

FIGS. 2 to 4 show specific embodiments of such a heat exchanger, which may be used for the apparatus of the present invention. Referring to FIGS. 2(a) and (b), a plate fin type heat exchanger includes metal plates 111 and corrugated fins 112 alternatively laminated, and a regenerator chamber 104 packed with a hydrogen storing material and disposed in between a high temperature fluid pathway 102 and a low temperature pathway 103 provided with respective inlets and outlets which are disposed on respective sides at opposingly reversed positions. FIG. 3 illustrates a shell tube type heat exchanger wherein regenerator chamber 104 packed with a hydrogen storing material, is likewise disposed in between a high temperature fluid pathway 102 and a low temperature fluid pathway 103 which are formed by a partition wall.

Further, in FIG. 4, a heat exchanger is illustrated which has a triple-pipe structure including an inner pipe, an outer pipe and an intermediate pipe disposed inbetween, and in which the inner pipe constitutes a high temperature fluid pathway 102, the outer pipe constitutes a low temperature fluid pathway 103 and the intermediate pipe constitutes a regenerator chamber 104 packed with a hydrogen storing material.

In each of these Figures, symbol A indicates the flow route of the high temperature fluid and B indicates the flow route of the low temperature fluid. The hydrogen storing material packed in the regenerator chamber 104 disposed in between, generates heat under proper heat and pressure provided by the high temperature fluid irrespective of its exothermic or endothermic reaction and transmits this heat via the inner fins or plates of the heat exchanger to the low temperature fluid.

Now, the manner of heat exchange will be described with reference to FIG. 1. Where a high temperature fluid is introduced from the flow route A into the high temperature pathway 2 of the heat exchanger, and a low temperature fluid is introduced from other route B into the low temperature fluid pathway 3, steady heat transfer is accomplished if $Q_A = Q_B + Q_L$ is satisfied, where $Q_A$ is the quantity of heat transfer from the high temperature fluid, $Q_B$ is the quantity of heat required to heat the lower temperature fluid and $Q_L$ is heat loss in the heat exchanger 1. However, the above balance is broken if $Q_A$ changes with time as in the case of the solar heat or an exhaust heat, or if the required quantity of heat $Q_B$ changes with time.

If the quantity of heat transfer from the high temperature fluid increases or the required quantity of heat decreases, so that $$Q_A > Q_B + Q_L$$

is satisfied, the excess quantity of heat represented by $$\Delta Q = Q_A - Q_B - Q_L$$

will be transmitted to the hydrogen storing material in the regenerator chamber 4, whereupon hydrogen stored in the hydrogen storing material is discharged by a decomposition reaction (endothermic reaction) represented by $$MeH \rightarrow ME + H_2$$

and thereby the excess quantity of heat ($\Delta Q$) is stored in the hydrogen storing material. In this case, the discharged hydrogen is transferred via withdrawal line 7, valve $V_2$, supply line 9, compressor 5, high pressure line line 8 and valve $V_2$, to hydrogen reservoir 6 and stored therein.

In case the quantity of heat transfer $Q_A$ decreases or the required quantity of heat $Q_B$ increases so that $$Q_A < Q_B + Q_L$$

is satisfied, the hydrogen in the reservoir 6 will be supplied via valve $V_4$, line 9, compressor 5 and valve $V_1$ to regenerator chamber 4, whereupon an quantity of heat corresponding to the deficit $$\Delta Q = Q_B + Q_L - Q_A$$

will be determined by $$Me + H_2 \rightarrow MeH \text{ (exothermic reaction)}$$

to the low temperature fluid, whereby the condition of $$Q_A = Q_B + Q_L$$

will be maintained.

Further, the quantity of each of the exothermic and endothermic reactions, may readily be controlled to maintain an equilibrium pressure by adjusting the pressure of the compressor 5.

Thus, it is possible to obtain a heat generative function not only in the case where the high temperature fluid and the low temperature fluid are continuously supplied, but also in the case where only one or both of the fluid are intermittently supplied, and thus to level off the differentials in the patterns of the input and output sides. This means, at the same time, that it is possible to obtain a thermal buffer action.

The hydrogen storing material which is packed in regenerator chamber 4 is a material prepared by pulverizing an intermetallic compound such as iron-titanium into fine powder, mixing the fine powder with an alumina gel, a silica gel or other stable inorganic or organic carrier, and solidifying the mixture by baking it in an atmosphere suitable to it such as under vacuum or in an inert gas atmosphere or by forming with use of an appropriate binder. The hydrogen storing material thereby obtained may be in any form such as granules or plates, and it may be formed into an appropriate form depending upon the particular purpose. Further, formed granular products may be fixed together. Or the formed products may have a structure of a porous solid carrier with finely pulverized hydrogen storing material fixed in the pores.

It is also effective to incorporate into the hydrogen storing material a catalyst capable of facilitating hydrogenation at the time of the absorption of hydrogen.

Thus, the present invention provides a heat exchange apparatus wherein a regenerator chamber packed with the hydrogen storing material is disposed between the high temperature fluid pathway and the low temperature fluid pathway, the high temperature fluid pathway is connected to a heat source and the low temperature fluid pathway is connected to a heat utilizing system, and the regenerator chamber is connected via a pressure controlling mechanism to the hydrogen reservoir, whereby by the reaction of the metal hydride, heat absorption or heat discharge is automatically performed depending upon the change of the quantity of heat which is variable with time, such as solar heat or heat of a plant exhaust gas, and an excess quantity of heat is stored and a deficit in the quantity of heat is supplemented by a discharge of the stored heat thereby leveling off the fluctuations of the quantity of heat. Thus, the present invention makes a wide range of applications of heat possible, which used to be prevented because of the fluctuations of the heat, and which used to be limited to the recovery and reuse of a sensible heat, thus solving a problem of industry with respect to energy deficiency and contributing to the effective use of energy.

Further, the apparatus of the present invention does not require a complicated hydrogen storing tank, and accordingly it is readily possible to make it compact with simple and effective pressure control provided by the pressure controlling mechanism. Especially, an effective thermal buffer action is obtainable with the provision of the regenerator chamber in between the high temperature fluid pathway and the low temperature fluid pathway, and an effective use of heat is possible with a proper heat transmission. Further, various types of heat exchangers may optionally be used present invention is expected to be quite useful as an installation for industrialization.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A heat exchange apparatus for use with hydrogen storing material, comprising;
   a hydrogen reservoir;
   a heat source;
   a heat exchanger having a low temperature fluid pathway defined by first closed conduit means in said heat exchanger and a high temperature fluid pathway independent of said low temperature fluid pathway and defined by second closed conduit means in said heat exchanger;
   pressure controlling means;
   a heat utilizing system; and
   a regenerator chamber packed with a heat storing material and disposed only between said high temperature fluid pathway and said low temperature fluid pathway of said heat exchanger, wherein the high temperature fluid pathway is connected to said heat source and the low temperature fluid pathway is connected to said heat utilizing system, and said regenerator chamber is connected via said pressure controlling means to said hydrogen reservoir.

2. The heat exchanger apparatus for use with hydrogen storing material as claimed in claim 1, wherein said heat exchanger further comprises a plate fin heat exchanger having a plurality of metal plates and corrugated fins alternatively laminated to form a plurality of layers, and wherein a regenerator chamber is formed in every second layer.

3. The heat exchange apparatus for use with hydrogen storing material as claimed in claim 1, wherein said heat exchanger further comprises a triple pipe assembly and an intermediate pipe thereof comprises said regenerator chamber.

4. The heat exchange apparatus for use with hydrogen storing material as claimed in claim 1, wherein the heat exchanger further comprises a shell tube type heat exchanger having an inner and outer pipe assembly and the space between the outer pipe and the inner pipe comprises said regenerator chamber.

5. The heat exchange apparatus for use with hydrogen storing material as claimed in claims 1, 2, 3 or 4, wherein the hydrogen storing material packed in the generator chamber comprises a baked material solidified into a powder mixture of a metal hydride powder and a porous carrier into predetermined shape.

6. The heat exchange apparatus of claims 1, 2, 3 or 4 wherein said pressure controlling means comprises means for maintaining a predetermined hydrogen pressure in said regenerator chamber, whereby the rate of reaction of said heat storing material is controlled.

7. The heat exchange apparatus of claims 1 or 6 wherein said pressure controlling means comprises an adjustable compressor.

* * * * *